July 28, 1970 J. T. RICKETTS ET AL 3,522,384
CONSTANT CURRENT OPERATION OF CENTRAL OFFICE TELEPHONE EQUIPMENT
Filed Jan. 16, 1968
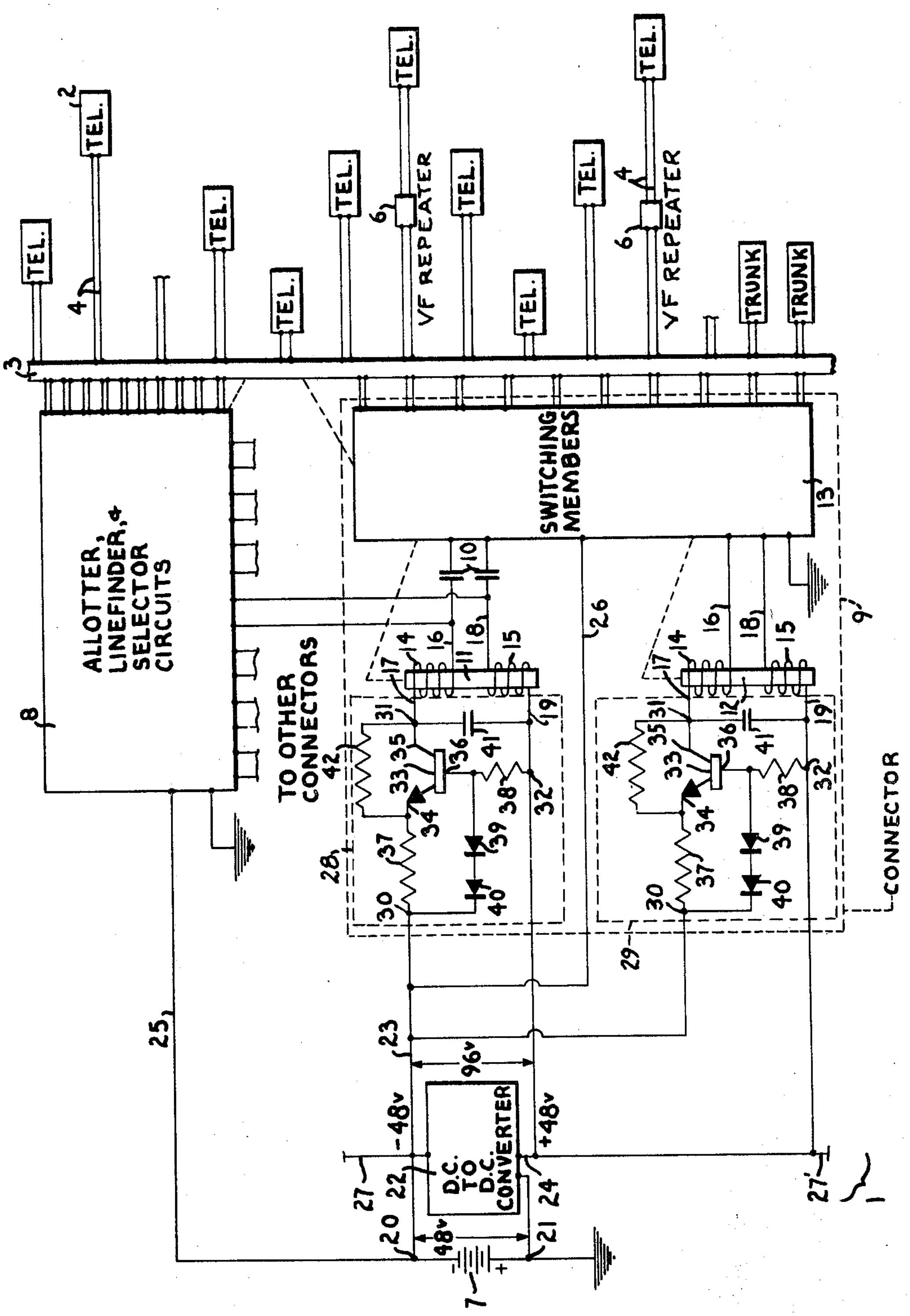
INVENTORS.
JAMES T. RICKETTS and
JOHNNY L. RICKETTS
BY
Fishburn, Gold & Litman
ATTORNEYS United States Patent Office 3,522,384

Patented July 28, 1970

3,522,384
CONSTANT CURRENT OPERATION OF CENTRAL OFFICE TELEPHONE EQUIPMENT

James T. Ricketts and Johnny L. Ricketts, Amarillo, Tex., assignors to Tri-State Communication Service, Inc., Amarillo, Tex., a corporation of Texas Filed Jan. 16, 1968, Ser. No. 698,222
Int. Cl. H04q *1/28*
U.S. Cl. 179—16 8 Claims

ABSTRACT OF THE DISCLOSURE

Central office telephone equipment includes constant current regulators in the connector circuits between a common battery current source, which may be elevated above normal central office battery potential, and the feed coils of the transmission relays, providing several advantages which may include the elimination of long line adapters, improvements in transmission quality, better overall signalling capability and less battery drain.

This invention relates to telephone exchange systems and more particularly to the use of current regulating devices is central office telephone equipment employing common battery signalling and talking.

Telephones located on subscribers' premises are normally connected to the central office or switching station by means of two metallic conductors arranged to form a subscriber's loop. Such loops often vary greatly in length and other characteristics resulting in different loop impedances as seen from the central office. It is economically important that remote subscribers obtain telephone service but, this presents difficult problems related to the signal attenuation experienced with the high impedance loops. Merely increasing battery voltage in the central office is generally not satisfactory since this tends to result in excessive currents being applied to the shorter loops.

A common method to overcome these problems involves the use of long line adapters or boosters located in the central office and operable to increase battery potential across the long loop. Also, special telephone sets containing amplifiers have been suggested for use with long loops. In each case, however, the special equipment is dedicated to particular loops or groups of loops, resulting in considerable extra expense and the need for highly skilled personnel able to properly install and service the special equipment.

This invention contemplates improved central office telephone equipment of the type employing common battery signalling and common battery talking through the inclusion of constant current regulators in the normal connector circuits between the battery and the transmission relay feed coils. This permits the battery potential to be elevated, if desired, without danger to equipment or interference with short loop performance and further allows more optimum transmission of voice frequency information (with or without voice frequency repeaters) and signalling on all loops without requiring special circuitry or dedicated boosters. These advantages may be obtained through a relatively simple and low cost modification which does not result in a significant addition to system noise and does not materially increase the danger to telephone equipment from abnormal conditions such as lightening surges or unexpected circuit shorts.

The principal objects of the present invention are: to provide an improved telephone system which greatly extends the permissible length or impedance of subscriber loops without long line adapters or other special dedicated power equipment; to provide such a system which permits optimum performance of subscriber telephones regardless of the individual loop characteristics thereof; to provide such a telephone system which is well adapted to take advantage of the smaller diameter loop lines designed for buried cable; to provide such an arrangement which provides constant current operation to subscriber telephones regardless of the location of the phone with respect to the central office; to provide a constant current regulator in normal central office connector circuits which is inexpensive in construction and reliable in use; and to provide such an arrangement which is easily incorporated in existing or new central office equipment and which improves overall telephone system operation.

Other objects and advantages of this invention will become apparent from the following description taken in connection with the accompanying drawing wherein certain embodiments are set forth by way of illustration to exemplify this invention.

FIG. 1 is a schematic wiring diagram showing a telephone system employing this invention.

Referring to the drawing in more detail:

The reference numeral 1 generally indicates a common battery signalling and talking telephone system. The telephone system 1 is characterized by subscriber telephone sets 2 located at greatly varying distances from the central office connection 3 and communicating therewith through metallic wire line pairs 4 forming subscriber loops of greatly varying load impedance. Voice frequency repeaters 6 may be used where necessary on long lines for voice frequency amplification.

The equipment in the central office includes a central office battery 7, allotter, linefinder, and selector circuits 8, which may be connected in various relationships with each other depending upon the type of telephone system involved, and a plurality of connector circuits 9, for example, supplied in a ratio of 10 connector circuits for each 100 subscriber loops. Except as described below, the system operates in the conventional manner wherein the circuits 8 seize and identify a calling loop and select an available connector circuit 9 which operates to produce ringing signals in a called loop, and ultimately, a voice frequency connection between the loops through transmission condensers 10.

Each of the connector circuits 9 include a calling transmission relay set 11 and a called transmission relay set 12 which, in this example, are respectively schematically illustrated as bifilar wound cores, however, it is to be understood that separate cores for each relay set may be utilized without departing from the scope of this invention. The relay sets 11 and 12 are respectively operable to control switching members 13 for selecting signalling and completing a talking connection between a calling loop and a called loop.

The relay sets 11 and 12 each have a first feed coil 14 and a second feed coil 15 through which relay power is obtained for controlling the switching members 13. The feed coils 14 have a lead 16 which connects ultimately to one arm of the subscriber loop and a lead 17 which connects ultimately to one arm of the battery while the second feed coils 15 have corresponding leads 18 and 19. The leads 16 and 18 of the calling relay set 11 are connectable respectively to the line pairs 4 of a calling loop through the circuits 8. The leads 16 and 18 of the called relay set 12 are connectable respectively to the legs of a called loop through the switching members 13, the AC or voice frequency connection between the respective called and calling loops being maintained with D.C. isolation through the transmission condensers 10.

In this example, the battery terminals 20 and 21 are connected across a D.C. to D.C. converter 22 for example, a 48 volt to 48 volt Lorain Model RB2B which elevates the voltage between the output potential leads 23 and 24 to 96 volts D.C. Switch operating current for the circuits 8 and connectors 9, in this example, is supplied through lines 25 and 26 which are respectively connected to the negative battery potential from terminal 20, using ground potential for circuit completion. Line extensions 27 and 27′ are directed to other connector circuits (not shown) similar to circuit 9 and also having access to the subscriber loops. The leads 19 of the relay sets 11 and 12 are connected to the positive battery (converter) output or lead 24.

Current regulators generally designated 28 and 29 are provided respectively for the relay sets 11 and 12 and each regulator includes an input terminal 30, an output terminal 31 and a bias terminal 32. An NPN power transistor 33 is included in each of the regulators and has an emitter electrode 34, a collector electrode 35 and a base electrode 36. A first resistor 37 is connected between the input terminal 30 and the emitter electrode 34 and a second or bias resistor 38 is connected between the base electrode 36 and the bias terminal 32. The output terminal 31 is connected to the collector electrode 35. A pair of series connected diodes 39 and 40 are coupled between the base electrode 36 and the input terminal 30 providing a non-linear resistance therebetween with respect to changing voltage in contrast with the substantially constant resistance exhibited by the resistor 37. A capacitor 41 is connected between the bias terminal 32 and the output terminal 31 and a third resistor 42 is connected between the emitter electrode 34 and the collector electrode 35.

The input terminals 30 of the respective current regulators 28 and 29 are connected to the other battery (converter) terminal or the negative output potential lead 23, the bias terminals 32 being respectively connected to the positive potential lead 24 along with the feed coil leads 19.

In operation, the regulators 28 and 29 provide constant D.C. loop current to both the calling and called party loops, regardless of the impedance of either loop, to the limit of the available potential. Specifically, the component values are selected so that the emitter is sufficiently negative relative to the base to allow the desired current flow through the emitter-collector path and thus through the resistor 37 and the particular subscriber loop which is involved. When another subscriber loop having a different impedance is connected across the leads 16 and 18, a difference in current through the resistor 37 is experienced which is reflected in a voltage drop difference across resistor 37. A voltage drop difference is also reflected across the diodes 39 and 40, but on a non-linear basis, producing a change in potential difference between the emitter and base and causing a change in emitter-collector path impedance only until the desired current flow is achieved through the resistor 37. Thus, a variation in battery potential also will not upset the desired constant current operation.

The feed coils 14 and 15 are at all times positioned between the current regulators 28 and 29 and the subscriber loops, thus acting to isolate and protect the regulator components from potentially dangerous current surges due to lightning or other abnormal condition. The resistor 42 functions as a protective device by dividing loop current with the transistor and reducing the shock from any high voltage transients. The capacitor 41 also functions to protect the circuit components from high voltage transients and further helps to maintain low impedance balance at voice frequencies between the feed coils 14 and 15.

By way of example, typical components of the current regulators 28 and 29 for about 35 ma. D.C. loop current are: resistor 37, 22 ohms; transistor 33, RCA 40322; resistor 42, 4.7K ohms; diodes 39 and 40, IN 461A; resistor 38, 22K ohms; capacitor 41, 50 mf. It is to be understood that a PNP junction transistor could also be used in which case polarities would be reversed.

Because current through the subscriber loops remain substantially constant, there is no undesirable risk to the feed coils 14 and 15 or other components which would otherwise be caused by raising the voltage across the loops above normal values. In this example, the voltage between potential leads 23 and 24 has been doubled over the design value by the converter 22, thereby greatly increasing the permissible impedance of the loops without the need for long line adapters. Another significant advantage is that the constant D.C. current through subscriber loops tends to result in a relatively constant A.C. impedance in the loops, enabling optimum design of special A.C. amplifiers and/or A.C. interconnecting circuits to minimize the loss of voice frequency information between both loop and trunk connections. Also, the constant D.C. current, regardless of the loop length, greatly aids in obtaining accurate, repeatable pulsing or signaling in the central office, upgrading switching and counting functions as well as improving the overall quality of voice frequency transmission. Because only optimum current flows through subscriber loops it has been found, that on the average, battery drain is greatly reduced since the excessive loss due to high current in short loops is eliminated. Switch contact generated noise, which increases with increasing current and has been a problem on short loops, is minimized. It is noted that, with regard to trunk calls, either incoming or outgoing, only the local loop regulator is normally needed.

Other current regulating circuits may be adapted for use in place of the regulators 28 and 29 described herein, for example, the various circuits disclosed in U.S. Pat. No. 2,978,630, issued Apr. 4, 1961. Also, it is noted that the practice of this invention does not require the converter 22 or that a higher than normal loop voltage be available across the central office ends of the subscriber loops but, rather, the ability to use the higher voltage to increase subscriber range without long line adapters and the like is a beneficial result to be obtained from the practice of this invention.

In selector board telephone systems, the current regulator should also be placed between the power source and feed coils of the selector switching relay so the selector will receive sufficient pulsing current on long lines in absence of long line adapters.

It is to be understood that although one form of this invention has been illustrated and described, it is not to be limited thereto except insofar as such limitations are included in the following claims.

What we claim and desire to secure by Letters Patent is:

1. In a telephone system including a central office potential source producing a D.C. voltage across said system and a connector circuit having selective access to a plurality of subscriber loops of various load impedance, said connector circuit including a transmission relay set having a first and a second current feed coil, said feed coils each having a lead connected to respective legs of a selected subscriber loop and a lead connected to respective legs of the potential source, the improvement comprising:

(a) a current regulator connected between said potential source and said relay set and operative to feed a constant current from said potential source through said selected loop.

2. The telephone system as set forth in claim 1 wherein:

(a) said potential source is a battery.

3. The telephone system as set forth in claim 2 including:

(a) a D.C. to D.C. converter connected between said battery and said regulator and operative to raise the D.C. voltage available to said regulator above the potential of said battery.

4. The telephone system as set forth in claim 1 wherein said regulator includes:

(a) an input terminal and an output terminal and a bias terminal, a transistor having an emitter electrode and a collector electrode and a base electrode, a first resistor connected between said input terminal and said emitter electrode, a second resistor connected between said base electrode and said bias terminal, said output terminal being connected to said collector electrode, and a pair of diodes connected cathode to anode in series and connected between said base electrode and said input terminal, (b) said input terminal being connected to one side of said potential source, said bias terminal being connected to the other side of said potential source and to one of said feed coil potential source leads, and said output terminal being connected to the other of said feed coil potential source leads.

5. The telephone system as set forth in claim 4 including:

(a) a resistor connected between said emitter electrode and said collector electrode and operative to divide current flow through said selected loop with said transistor.

6. The telephone system as set forth in claim 4 including:

(a) a capacitor connected between said bias terminal and said output terminal and operative to absorb high voltage transients and maintain low impedance balance at voice frequencies between said feed coils.

7. A telephone system comprising:

(a) a central office battery providing a D.C. voltage thereacross and a connector circuit having ordered access to a plurality of calling metallic wire subscriber loops of various load impedance and called metallic wire subscriber loops of various load impedance, (b) said connector circuit including a calling transmission relay set and a called transmission relay set and a pair of relay capacitors, said relay sets being operable to control switching members for selecting and completing a talking connection between a calling loop and a called loop while maintaining D.C. isolation therebetween through said relay capacitors, (c) said relay sets each having a first and a second current feed coil to operate same, each of said feed coils having a first lead and a second lead, (d) the first leads of said calling relay set being connectable respectively to the legs of said calling loop, the first leads of said called relay set being connectable respectively to the legs of said called loop, one of said second leads of each relay set being connected to one side of said battery, (e) a current regulator for each of said relay sets, said regulators each including: an input terminal and an output terminal and a bias terminal, a transistor having an emitter electrode and a collector electrode and a base electrode, a first resistor connected between said input terminal and said emitter electrode, a second resistor connected between said base electrode and said bias terminal, said output terminal being connected to said collector electrode, and a pair of diodes connected cathode to anode in series and connected between said base electrode and said input terminal, (f) the input terminals of said regulators being connected to the other side of said battery, said bias terminals being connected to said one side of said battery, and said output terminals being connected respectively to the other second lead of said relay sets.

8. The telephone system as set forth in claim 7 including:

(a) converting means connected between said battery and regulator for raising the D.C. voltage available across said subscriber loops.

References Cited

UNITED STATES PATENTS

| | | | |
|---|---|---|---|
| 3,459,895 | 8/1969 | Ebhardt. | |
| 3,035,122 | 5/1962 | Livingstone | 179—16 |
| 3,251,951 | 5/1966 | Meewezen | 179—81 |
| 3,320,511 | 5/1967 | Tiemann | 321—2 |

KATHLEEN CLAFFY, Primary Examiner

D. L. STEWART, Assistant Examiner